US007895654B1

(12) United States Patent
Millard

(10) Patent No.: US 7,895,654 B1
(45) Date of Patent: Feb. 22, 2011

(54) EFFICIENT FILE SCANNING USING SECURE LISTING OF FILE MODIFICATION TIMES

(75) Inventor: John Millard, Pasadena, CA (US)

(73) Assignee: Symantec Corporation, Mountain View, CA (US)

(*) Notice: Subject to any disclaimer, the term of this patent is extended or adjusted under 35 U.S.C. 154(b) by 1440 days.

(21) Appl. No.: 11/167,521

(22) Filed: Jun. 27, 2005

(51) Int. Cl.
*G06F 12/14* (2006.01)

(52) U.S. Cl. .......................... 726/24; 713/187; 709/229

(58) Field of Classification Search .................. 726/22, 726/24; 713/187; 709/229; 707/9, 203
See application file for complete search history.

(56) References Cited

U.S. PATENT DOCUMENTS 5,398,196 A 3/1995 Chambers
5,452,442 A 9/1995 Kephart
5,495,607 A 2/1996 Pisello et al.
5,572,590 A 11/1996 Chess
5,675,710 A 10/1997 Lewis
5,694,569 A 12/1997 Fischer
5,826,249 A 10/1998 Skeirik
5,832,208 A 11/1998 Chen et al.
5,832,527 A 11/1998 Kawaguchi
5,854,916 A 12/1998 Nachenberg
5,884,033 A 3/1999 Duvall et al.
5,944,821 A 8/1999 Angelo
5,974,549 A 10/1999 Golan
6,006,242 A 12/1999 Poole et al.
6,021,510 A * 2/2000 Nachenberg ................. 714/38
6,023,723 A 2/2000 McCormick et al.
6,052,709 A 4/2000 Paul
6,072,942 A 6/2000 Stockwell et al.
6,092,194 A 7/2000 Touboul
6,094,731 A 7/2000 Waldin et al.
6,125,459 A 9/2000 Andoh et al.
6,161,130 A 12/2000 Horvitz et al.
6,253,169 B1 6/2001 Apte et al.
6,298,351 B1 10/2001 Castelli et al.
6,347,310 B1 2/2002 Passera
6,370,526 B1 4/2002 Agrawal et al.
6,397,200 B1 5/2002 Lynch et al.
6,397,215 B1 5/2002 Kreulen et al.

(Continued)

FOREIGN PATENT DOCUMENTS

EP 0636977 A2 2/1995

(Continued)

OTHER PUBLICATIONS

Burchell, Jonathan, "NetShield 1.5", Virus Bulletin, Oxfordshire, England, Aug. 1994, pp. 21-23, XP 000617453.

(Continued)

*Primary Examiner*—Benjamin E Lanier
*Assistant Examiner*—Hadi Armouche
(74) *Attorney, Agent, or Firm*—Fenwick & West LLP

(57) ABSTRACT

A scanning optimization manager efficiently scans files for malicious code. The scanning optimization manager maintains a non-tamperable record of modifications to files on a volume. The scanning optimization manager receives at least one malicious code signature. Responsive to the receipt of the at least one malicious code signature, the scanning optimization manager scans at least some files on the volume for the at least one malicious code signature at a priority corresponding to an associated modification status.

21 Claims, 2 Drawing Sheets

U.S. PATENT DOCUMENTS

| | | | |
|---|---|---|---|
| 6,401,122 | B1 | 6/2002 | Matsui et al. |
| 6,421,709 | B1 | 7/2002 | McCormick et al. |
| 6,424,960 | B1 | 7/2002 | Lee et al. |
| 6,442,606 | B1 | 8/2002 | Subbaroyan et al. |
| 6,456,991 | B1 | 9/2002 | Srinivasa et al. |
| 6,502,082 | B1 | 12/2002 | Toyama et al. |
| 6,505,167 | B1 | 1/2003 | Horvitz et al. |
| 6,546,416 | B1 | 4/2003 | Kirsch |
| 6,721,721 | B1 | 4/2004 | Bates et al. |
| 6,751,789 | B1 | 6/2004 | Berry et al. |
| 6,772,346 | B1 | 8/2004 | Chess et al. |
| 6,842,861 | B1 | 1/2005 | Cox et al. |
| 6,886,099 | B1 | 4/2005 | Smithson et al. |
| 6,944,555 | B2 | 9/2005 | Blackett et al. |
| 6,952,779 | B1 | 10/2005 | Cohen et al. |
| 6,973,578 | B1 | 12/2005 | McIchionc |
| 7,024,403 | B2 | 4/2006 | Kyler |
| 7,130,981 | B1 * | 10/2006 | Nachenberg ................ 711/170 |
| 7,188,367 | B1 * | 3/2007 | Edwards et al. ............... 726/24 |
| 7,331,062 | B2 * | 2/2008 | Alagna et al. ................. 726/23 |
| 7,484,094 | B1 * | 1/2009 | Millard et al. .............. 713/165 |
| 7,640,586 | B1 * | 12/2009 | Johnson et al. ............... 726/24 |
| 2002/0035693 | A1 | 3/2002 | Eyres et al. |
| 2002/0038308 | A1 | 3/2002 | Cappi |
| 2002/0046207 | A1 | 4/2002 | Chino et al. |
| 2002/0073046 | A1 | 6/2002 | David |
| 2002/0087649 | A1 | 7/2002 | Horvitz |
| 2002/0138525 | A1 | 9/2002 | Karadimitriou et al. |
| 2002/0147694 | A1 | 10/2002 | Dempsey et al. |
| 2002/0147782 | A1 | 10/2002 | Dimitrova et al. |
| 2002/0178375 | A1 | 11/2002 | Whittaker et al. |
| 2002/0194488 | A1 | 12/2002 | Cormack et al. |
| 2002/0194489 | A1 | 12/2002 | Almogy et al. |
| 2002/0199186 | A1 | 12/2002 | Ali et al. |
| 2002/0199194 | A1 | 12/2002 | Ali |
| 2003/0023875 | A1 | 1/2003 | Hursey et al. |
| 2003/0033587 | A1 | 2/2003 | Ferguson et al. |
| 2003/0061287 | A1 | 3/2003 | Yu et al. |
| 2003/0065926 | A1 | 4/2003 | Schultz et al. |
| 2003/0110280 | A1 | 6/2003 | Hinchliffe et al. |
| 2003/0110393 | A1 | 6/2003 | Brock et al. |
| 2003/0110395 | A1 | 6/2003 | Presotto et al. |
| 2003/0115458 | A1 | 6/2003 | Song |
| 2003/0115479 | A1 | 6/2003 | Edwards et al. |
| 2003/0154394 | A1 | 8/2003 | Levin |
| 2003/0167402 | A1 | 9/2003 | Stolfo et al. |
| 2003/0233352 | A1 | 12/2003 | Baker |
| 2004/0015554 | A1 | 1/2004 | Wilson |
| 2004/0039921 | A1 | 2/2004 | Chuang |
| 2004/0068663 | A1 * | 4/2004 | Sobel ......................... 713/200 |
| 2004/0103310 | A1 | 5/2004 | Sobel et al. |
| 2004/0117401 | A1 | 6/2004 | Miyata et al. |
| 2004/0117641 | A1 | 6/2004 | Kennedy et al. |
| 2004/0220975 | A1 | 11/2004 | Carpentier et al. |
| 2005/0086499 | A1 * | 4/2005 | Hoefelmeyer et al. ....... 713/188 |
| 2005/0114708 | A1 * | 5/2005 | DeStefano et al. .......... 713/201 |
| 2005/0144202 | A1 * | 6/2005 | Chen .......................... 707/205 |

FOREIGN PATENT DOCUMENTS

| | | | |
|---|---|---|---|
| EP | 1408393 | A2 | 4/2004 |
| WO | WO 99/15966 | A1 | 4/1999 |
| WO | WO 00/28420 | A1 | 5/2000 |
| WO | WO 02/33525 | A2 | 4/2002 |

OTHER PUBLICATIONS

Morar, J. E. and Chess, D. M., "Can Cryptography Prevent Computer Viruses?", Virus Bulletin Conference 2000, Oxfordshire, England, Sep. 2000, pp. 127-138, Virus Bulletin Ltd.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>. U.S.A.

"Enterprise Protection Strategy" [online] Trend Micro Inc. [retrieved Dec. 3, 2002] Retrieved from the Internet: <URL: http://www.trendmicro.com/en/products/eps/features.htm>. Cupertino, California.

"How to Test Outbreak Commander", :Trend Micro Inc., Aug. 2002, pp. 1-13, Cupertino, CA.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>. U.S.A.

Bontchev, Vesselin, "Possible Macro Virus Attacks and How to Prevent Them", Computers & Security, vol. 15, No. 7, pp. 595-626, 1996, Reykjavik, Iceland.

* cited by examiner

100

EFFICIENT FILE SCANNING USING SECURE LISTING OF FILE MODIFICATION TIMES

TECHNICAL FIELD

This invention pertains generally to computer security, and more specifically to using a secure listing of file modification times to efficiently scan files for malicious code.

BACKGROUND

The time required to scan files on a volume for malicious code is a significant performance issue for anti-malicious code software. As volumes become increasingly large, scan times become slower. Decreasing the amount of time required for such scanning would be highly desirable.

The only time that a volume actually needs to be scanned is upon the receipt of new or updated malicious code signatures. Thus scheduled scans (e.g., weekly scans) are not optimal, as they can be executed unnecessarily, when no new malicious code signatures have arrived, and/or fail to be executed when new signatures are received. This shortcoming can be addressed by scanning the volume whenever a new malicious code signature is received. However, scanning the entire volume every time signatures are received is slow. The only files which are likely to be malicious are recently modified or arrived files, since infection of a file by malicious code necessitates modifying the file, or if a worm arrives, then it must be created on the volume. Therefore, only the more recently modified files need to be scanned when new malicious code signatures arrive.

Using the file system modification date to determine which files to scan or the order in which to scan files is not reliable, because this data is not secure. Malicious code can and often does set this date back, so as to attempt to hide the infection or arrival of the file. Thus, scanning only files that appear to be recently modified according to the file system could result in overlooking infected files. The volume change log (where one exists) is also insecure, and thus cannot be relied on for the same reasons.

What is needed are computer implemented methods, computer readable media and computer systems for scanning files on a volume at a priority corresponding to the actual most recent modification time, upon receipt of new malicious code signatures.

DISCLOSURE OF INVENTION

Computer-implemented methods, computer systems and computer-readable media efficiently scan files for malicious code. More specifically, a scanning optimization manager maintains a non-tamperable record of modifications to files on a volume. The scanning optimization manager receives at least one malicious code signature. Responsive to the receipt of the at least one malicious code signature, the scanning optimization manager scans at least M some files on the volume for the at least one malicious code signature at a priority corresponding to an associated modification status.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
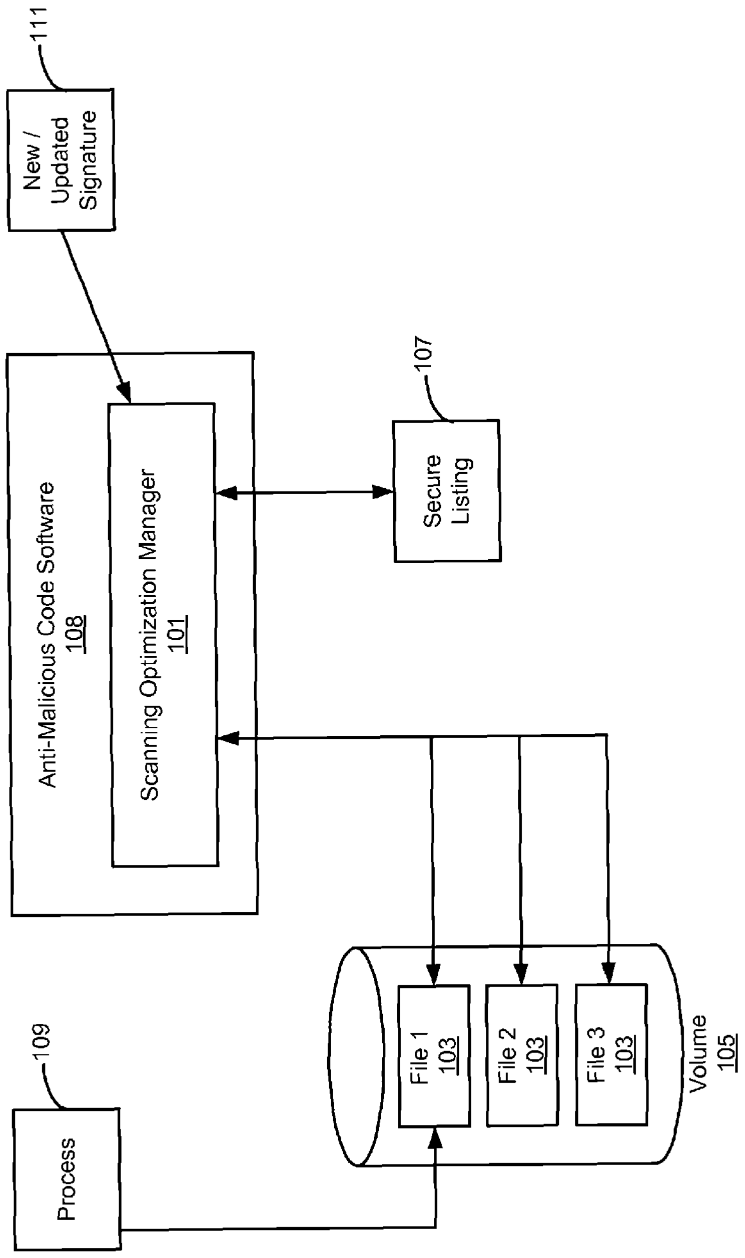
FIG. 1 is a block diagram illustrating a high level overview of a system for efficiently scanning files for malicious code according to some embodiments of the present invention.

FIG. 1 illustrates a high level overview of a system 100 for practicing some embodiments of the present invention. A scanning optimization manager 101 optimizes the scanning of files 103 on a volume 105 for malicious code by referring to a secure listing of file modification times 107. It is to be understood that although the scanning optimization manager 101 is illustrated as a single entity, as the term is used herein a scanning optimization manager 101 refers to a collection of functionalities which can be implemented as software, hardware, firmware or any combination of these. Where a scanning optimization manager 101 is implemented as software, it can be implemented as a standalone program, but can also be implemented in other ways, for example as part of a larger program, as a plurality of separate programs, as one or more device drivers or as one or more statically or dynamically linked libraries.

It is to be further understood that a scanning optimization manager 101 can be instantiated as part of an anti-malicious code software package 108 (as illustrated in FIG. 1) or as a component separate from the anti-malicious code software 108 that works in conjunction therewith. A scanning optimization manager 101 can be instantiated on and/or as part of a server, client, firewall, intrusion detection system, proxy, gateway, switch and/or any combination of these and/or other computing devices and/or platforms.

As illustrated in FIG. 1, the scanning optimization manager 101 maintains a non-tamperable record 107 of modifications to files 103 on a volume 105. In one embodiment, the scanning optimization manager 101 detects modifications being made to files 103 on the volume 105, for example file writes made by processes 109. Methodologies for detecting modifications being made to files 103 are known to those of ordinary skill in the relevant art, and the implementation mechanics of their use within the context of the present invention will be readily apparent to those so skilled in light of this specification. For example, system calls for modifying files 103 can be intercepted, or a file system filter driver can be used, or regular notifications from the operating system on file change can be used.

In many (but not all) embodiments of the present invention, modifications of temporary files 103 are not recorded. Additionally, many files 103 that are modified are deleted very shortly thereafter. In some embodiments, modified files 103 are watched for a short period of time (e.g., 30 seconds, 60 seconds, etc.) to determine whether they are subsequently deleted. Only if a file 103 is not deleted shortly after being modified is the modification logged. This cuts down on the number of files 103 that are logged for subsequent priority scanning. The exact interval can be adjusted by the end user for optimal performance on their machine.

As noted above, the scanning optimization manager 101 stores a secure record 107 of times at which modifications to files 103 are made. This record 107 is typically kept locked for exclusive access by the scanning optimization manager 101, and protected from access by other paths. How far back to maintain file 103 modification data is a variable design choice. Typically, files 103 that have not been modified within about two weeks are unlikely to be contain malicious code on a properly managed computer. Thus, in one embodiment, the scanning optimization manager 101 maintains the modification record 107 such that it contains a listing of modifications executed within the past two weeks. Of course, the record 107 can go back further (or less far) as desired, as space and efficiency permit.

Over time, anti-malicious code software 108 (e.g., anti-virus software) receives new or updated malicious code signatures 111 (e.g., from a server computer as part of an anti-malicious code software 108 signature 111 update process), as updated signatures 111 are identified and made available. Responsive to the receipt of a malicious code signature 111, the scanning optimization manager 101 scans at least some files 103 on the volume 105 for the malicious code signature 111 at a priority corresponding to the associated modification status (e.g., when the file 103 was last modified). The usual priority would be to scan the most recently modified files first, as these are files most at risk for being malicious.

The priority can be established by a combination of factors, (e.g., the modification date, position on the volume). In one embodiment the files 103 are grouped by access date, and then scanned within each group in the order in which they occur on the volume.

Figure 2:
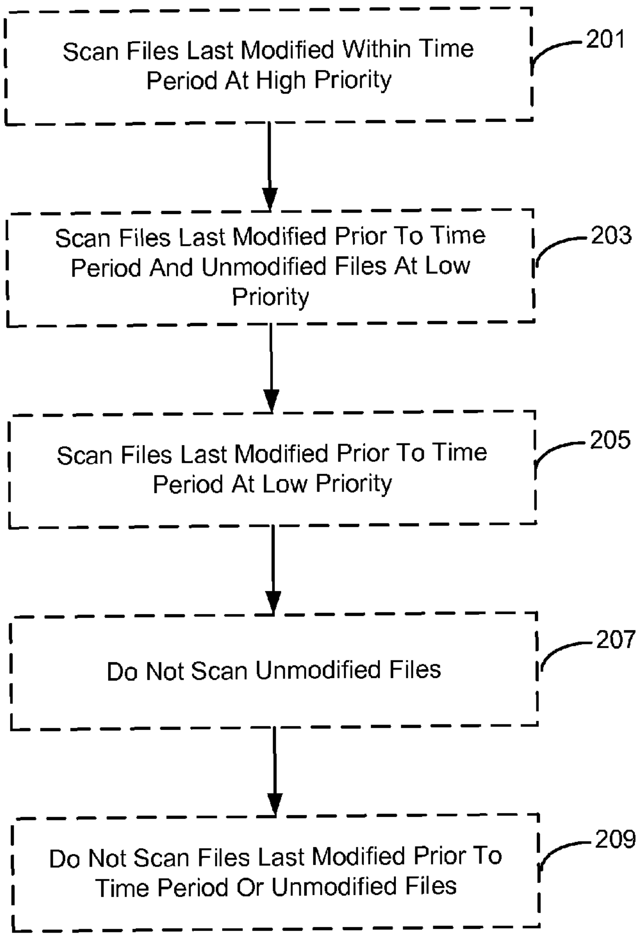
FIG. 2 is a flowchart, illustrating steps for efficiently scanning files for malicious code, according to some embodiments of the present invention.

As illustrated in FIG. 2, in various embodiments of the present invention, many variations can be employed in order to scan files 103 at a priority corresponding to an associated modification status. For example, in some embodiments, the scanning optimization manager 101 scans 201 files 103 last modified within a defined time period at a high priority (e.g., as soon as possible) and scans 203 files 103 last modified prior to the defined time period (or not modified at all) at a low priority (e.g., in the background, or only when the CPU is otherwise idle). It is to be understood that the value of the defined time period is a variable design parameter (for example, two weeks, ten days, three weeks).

In some embodiments, the scanning optimization manager 101 scans 201 files 103 last modified within the defined time period at a high priority, scans 205 files 103 last modified prior to the defined time period at a low priority, and does not scan 207 unmodified files 103 at all.

In yet other embodiments, the scanning optimization in manager 101 scans 201 files 103 last modified within the defined time period, but does not scan 209 files last modified prior to the defined time period or unmodified files.

Over time, anti-malicious code software 108 (e.g., anti-virus software) receives new or updated malicious code signatures 111 (e.g., from a server computer as part of an anti-malicious code software 108 signature 111 update process), as updated signatures 111 are identified and made available. Responsive to the receipt of a malicious code methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, as executable program code stored on a computer-readable medium such as a hard drive, and/or in every and any other way known to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for efficiently scanning files for malicious code, the method comprising the steps of:

maintaining a non-tamperable record of modifications to files on a volume, the record of modifications to files indicating modification statuses of the files, a modification status indicating when an associated file was last modified, wherein maintaining the non-tamperable record further comprises:

responsive to a first file being modified, monitoring the first file for a short period of time after the modification to determine whether the first file is deleted during the short period of time, and performing a step from a group of steps comprising:

responsive to the first file not being deleted during the short period of time, recording the modification to the first file, and responsive to the first file being deleted during the short period of time, not recording the modification to the first file;

receiving at least one malicious code signature;

establishing a defined time period measured as an amount of time prior to a current time at which scanning is to be performed;

establishing a high priority for files last modified within the defined time period;

establishing a low priority for files last modified prior to the defined time period; and scanning files on the volume for the at least one malicious code signature responsive to the established priorities, the scanning comprising scanning files having established high priorities prior to scanning files having established low priorities.

2. The method of claim 1 wherein maintaining a non-tamperable record of modifications to files on a volume further comprises:

detecting modifications being made to files on the volume; and storing a secure record of times at which modifications to files are made.

3. The method of claim 1 wherein maintaining a non-tamperable record of modifications to files on a volume further comprises:

detecting deletion of at least one file in the record of modifications on the volume; and storing a secure record of the deletion.

4. The method of claim 1 wherein receiving at least one malicious code signature further comprises:

receiving at least one new malicious code signature.

5. The method of claim 1 wherein at least one of the steps is performed by at least one software component executing on at least one computing device from a group of computing devices consisting of:

a server;

a client;

a firewall;

an intrusion detection system;

a proxy;

a gateway; and a switch.

6. The method of claim 1 wherein maintaining a non-tamperable record of modifications to files on a volume further comprises:

maintaining a non-tamperable record of modifications to at least some files.

7. A non-transitory computer readable storage medium containing executable program code for efficiently scanning files for malicious code, the computer program code comprising:

program code for maintaining a non-tamperable record of modifications to files on a volume, the record of modifications to files indicating modification statuses of the files, a modification status indicating when an associated file was last modified, wherein the program code for maintaining the non-tamperable record further comprises:

program code for, responsive to a first file being modified, monitoring the first file for a short period of time after the modification to determine whether the first file is deleted during the short period of time, and program code for performing a step from a group of steps comprising:

responsive to the first file not being deleted during the short period of time, recording the modification to the first file, and responsive to the first file being deleted during the short period of time, not recording the modification to the first file;

program code for receiving at least one malicious code signature;

program code for establishing a defined time period measured as an amount of time prior to a current time at which scanning is to be performed;

program code for establishing a high priority for files last modified within the defined time period;

program code for establishing a low priority for files last modified prior to the defined time period; and program code for scanning files on the volume for the at least one malicious code signature responsive to the established priorities, the scanning comprising scanning files having established high priorities prior to scanning files having established low priorities.

8. The computer readable storage medium of claim 7 wherein the program code for maintaining a non-tamperable record of modifications to files on a volume further comprises:

program code for detecting modifications being made to files on the volume; and program code for storing a secure record of times at which modifications to files are made.

9. The computer readable storage medium of claim 7 wherein the program code for maintaining a non-tamperable record of modifications to files on a volume further comprises:

program code for detecting deletion of at least one file in the record of modifications on the volume; and program code for storing a secure record of the deletion.

10. The computer readable storage medium of claim 7 wherein the program code for receiving at least one malicious code signature further comprises:

program code for receiving at least one new malicious code signature.

11. The computer readable storage medium of claim 7 wherein at least some of the program code comprises program code for executing as part of a software component on at least one computing device from a group of computing devices consisting of:

a server;

a client;

a firewall;

an intrusion detection system;

a proxy;

a gateway; and a switch.

12. The computer readable storage medium of claim 7 wherein the program code for maintaining a non-tamperable record of modifications to files on a volume further comprises:

program code for maintaining a non-tamperable record of modifications to at least some files.

13. A computer system for efficiently scanning files for malicious code, the computer system comprising:

a volume for storing files;

a processor for executing software portions; and a computer readable storage medium containing executable software portions, the software portions comprising:

a software portion configured to maintain a non-tamperable record of modifications to files on the volume, the record of modifications to files indicating modification statuses of files, a modification status indicating when an associated file was last modified, wherein the software portion configured to maintain the non-tamperable record further comprises:

a software portion configured to, responsive to a first file being modified, monitor the first file for a short period of time after the modification to determine whether the first file is deleted during the short period of time, and a software portion configured to perform a step from a group of steps comprising:

responsive to the first file not being deleted during the short period of time, recording the modification to the first file, and responsive to the first file being deleted during the short period of time, not recording the modification to the first file;

a software portion configured to receive at least one malicious code signature;

a software portion configured to establish a defined time period measured as an amount of time prior to a current time at which scanning is to be performed;

a software portion configured to establish a high priority for files last modified within the defined time period;

a software portion configured to establish a low priority for files last modified prior to the defined time period; and a software portion configured to scan files on the volume for the at least one malicious code signature responsive to the established priorities, the scanning comprising scanning files having established high priorities prior to scanning files having established low priorities.

14. The computer system of claim 13 wherein the software portion configured to maintain a non-tamperable record of modifications to files on the volume further comprises:

a software portion configured to detect modifications being made to files on the volume; and a software portion configured to store a secure record of times at which modifications to files are made.

15. The computer system of claim 13 wherein the software portion configured to maintain a non-tamperable record of modifications to files on the volume further comprises:

a software portion configured to detect deletion of at least one file in the record of modifications on the volume; and a software portion configured to store a secure record of the deletion.

16. The computer system of claim 13 wherein the software portion configured to receive at least one malicious code signature further comprises:

a software portion configured to receive at least one new malicious code signature.

17. The computer system of claim 13 wherein at least one of the software portions comprises a software portion configured to execute as part of a software component on at least one computing device from a group of computing devices consisting of:

a server;

a client;

a firewall;

an intrusion detection system;

a proxy;

a gateway; and a switch.

18. The computer system of claim 13 wherein the software portion configured to maintain a non-tamperable record of modifications to files on the volume further comprises:

a software portion configured to maintain a non-tamperable record of modifications to at least some files.

19. The method of claim 1, wherein establishing priorities for scanning the files further comprises grouping the files responsive to the files' associated modification statuses and wherein the scanning comprises scanning the files within each group in the order in which the files occur on the volume.

20. The computer readable storage medium of claim 7, wherein the program code for establishing priorities for scanning the files further comprises program code for grouping the files responsive to the files' associated modification statuses and wherein the program code for scanning comprises program code for scanning the files within each group in the order in which the files occur on the volume.

21. The computer system of claim 13 wherein the software portion to scan the files further comprises a software portion configured to group the files responsive to the files' associated modification statuses and wherein the software portion to scan comprises software portion to scan the files within each group in the order in which the files occur on the volume.

* * * * *